(12) United States Patent
Jiang et al.

(10) Patent No.: US 11,262,638 B2
(45) Date of Patent: *Mar. 1, 2022

(54) LIQUID CRYSTAL MIXTURES FOR PITCH VARIABLE OPTICAL ELEMENTS

(71) Applicant: Facebook Technologies, LLC, Menlo Park, CA (US)

(72) Inventors: Yingfei Jiang, Menlo Park, CA (US); Afsoon Jamali, Menlo Park, CA (US); Changwon Jang, Menlo Park, CA (US); Adrian Travis, Menlo Park, CA (US); Andrew Maimone, Menlo Park, CA (US); Lu Lu, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 16/657,585

(22) Filed: Oct. 18, 2019

(65) Prior Publication Data

US 2021/0116776 A1   Apr. 22, 2021

(51) Int. Cl.
*C09K 19/02* (2006.01)
*G02F 1/29* (2006.01)
*C09K 19/14* (2006.01)
*C09K 19/58* (2006.01)
*C09K 19/04* (2006.01)

(52) U.S. Cl.
CPC ............ *G02F 1/29* (2013.01); *C09K 19/0258* (2013.01); *C09K 19/14* (2013.01); *C09K 19/58* (2013.01); *C09K 2019/0444* (2013.01); *G02F 1/294* (2021.01); *G02F 2201/122* (2013.01)

(58) Field of Classification Search
CPC ..................................................... C09K 19/14
See application file for complete search history.

(56) References Cited

U.S. PATENT DOCUMENTS

2018/0052341 A1 * 2/2018 Qin ..................... G02F 1/1337

FOREIGN PATENT DOCUMENTS

| WO | 2015074737 A1 | 5/2015 | |
| WO | WO-2015074737 A1 * | 5/2015 | ....... G02F 1/134309 |
| WO | 2018169783 A1 | 9/2018 | |
| WO | WO-2018169783 A1 * | 9/2018 | ............. C09K 19/56 |

OTHER PUBLICATIONS

International Search Report and Written Opinion dated Nov. 27, 2020, in International Application No. PCT/US2020/049618, filed on Sep. 7, 2020 (9 pages).
Yuan R., et al., "Continuously adjustable period optical grating based on flexoelectric effect of a bent-core nematic liquid crystal in planar cells," Optics Express, vol. 26, No. 4, pp. 4288-4299, Feb. 19, 2018 (12 pages).

* cited by examiner

*Primary Examiner* — Chanceity N Robinson
(74) *Attorney, Agent, or Firm* — Millburn IP PLLC

(57) ABSTRACT

A liquid crystal (LC) mixture for a pitch variable optical element is provided. The LC mixture includes a host LC and one or more LC dimers dissolved as a guest in the host LC. The host LC and the one or more LC dimers have respective dielectric anisotropies of opposite signs in nematic phase. A net dielectric anisotropy of the LC mixture is substantially neutral.

17 Claims, 12 Drawing Sheets

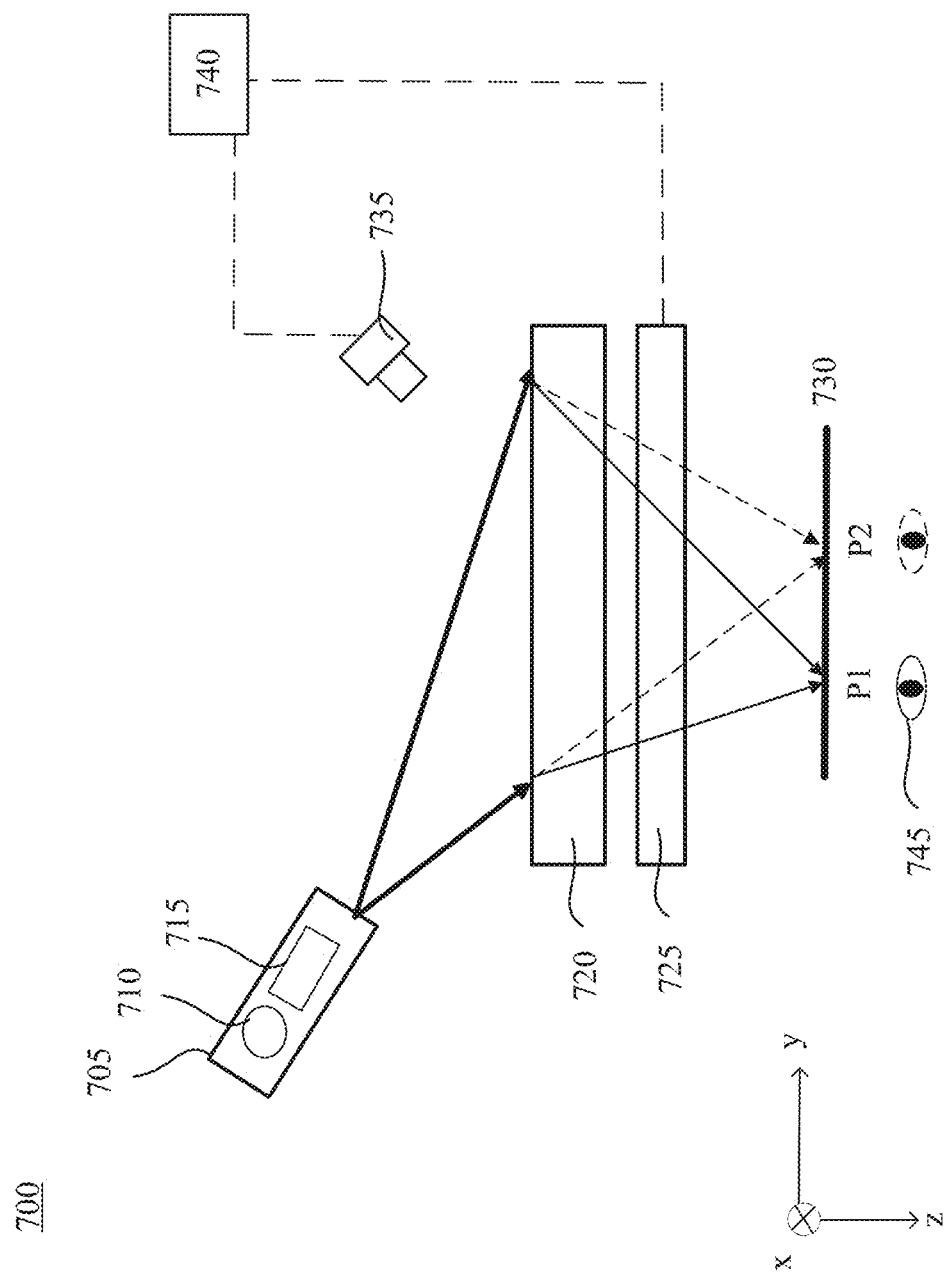

LIQUID CRYSTAL MIXTURES FOR PITCH VARIABLE OPTICAL ELEMENTS

BACKGROUND

The present disclosure generally relates to a liquid crystal (LC) mixture and, in particular, to a nematic LC mixture that exhibits a substantially neutral net dielectric anisotropy at a room temperature and is intended for pitch variable optical elements, and a pitch variable optical element containing the same.

As one of the well-known types of functional materials, LCs are widely applied in diffractive optical elements, such as diffraction gratings, diffractive lenses. LCs have become increasingly important for future information processing due to their advantages of low cost, low power consumption and simple preparation. In general, traditional electrically switchable diffractive optical elements using LCs have two categories: one is based on a nonuniform electric field distribution in LCs induced by patterned electrodes on one or both substrates, and the other is based on a periodic refractive index profile induced by multiple alignment regions or holographic recordings in a polymer-network liquid crystal composite. However, the manufacture and control of existing diffractive optical elements using LCs are complicated and expensive and, more important, the pitch of the diffraction structures in the existing diffractive optical elements using LCs is fixed and cannot be electrically continuously adjusted. Thus, the diffraction angle is fixed or cannot be electrically continuously adjusted.

BRIEF SUMMARY OF THE DISCLOSURE

One aspect of the present disclosure provides an LC mixture for a pitch variable optical element. The LC mixture includes a host LC and one or more LC dimers dissolved as a guest in the host LC. The host LC and the one or more LC dimers have respective dielectric anisotropies of opposite signs in nematic phase. A net dielectric anisotropy of the LC mixture is substantially neutral at a room temperature.

Another aspect of the present disclosure provides an optical element containing an LC mixture in accordance with the present discourse. The optical element includes a first electrode and a second electrode configured to provide a driving voltage to the optical element; and a disclosed LC mixture coupled to the first electrode and the second electrode. A pitch of flexoelectric domains (FDs) induced in the LC mixture is continuously variable with the driving voltage.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

FIG. 7 is a schematic diagram illustrating a schematic diagram of an optical assembly including a pitch variable optical element, according to another embodiment of the disclosure;

DETAILED DESCRIPTION

Figure 1A:
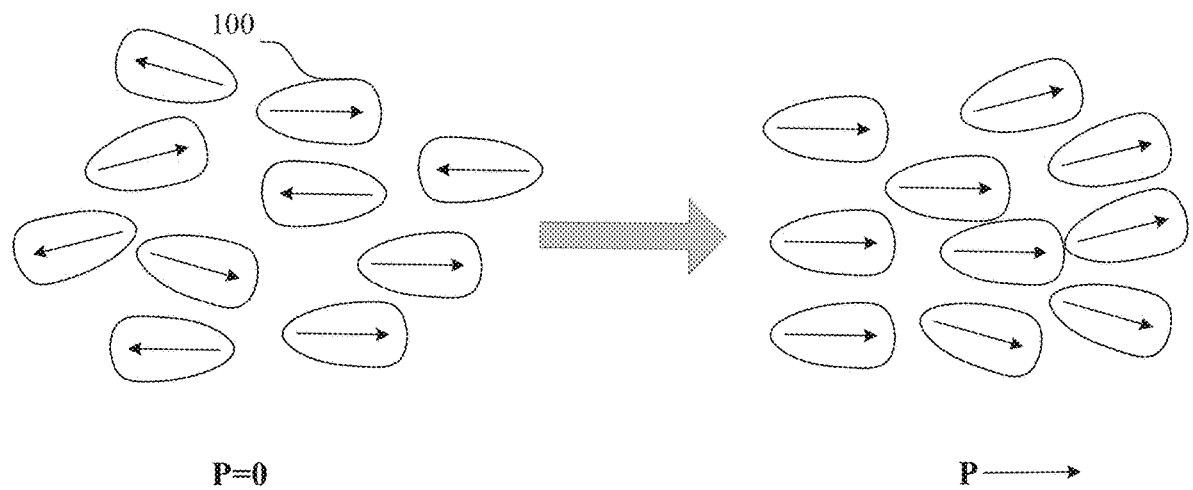
FIG. 1A is a schematic diagram illustrating spontaneous polarization of pear-shaped liquid crystal (LC) molecules under splay deformation.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Figure 1B:
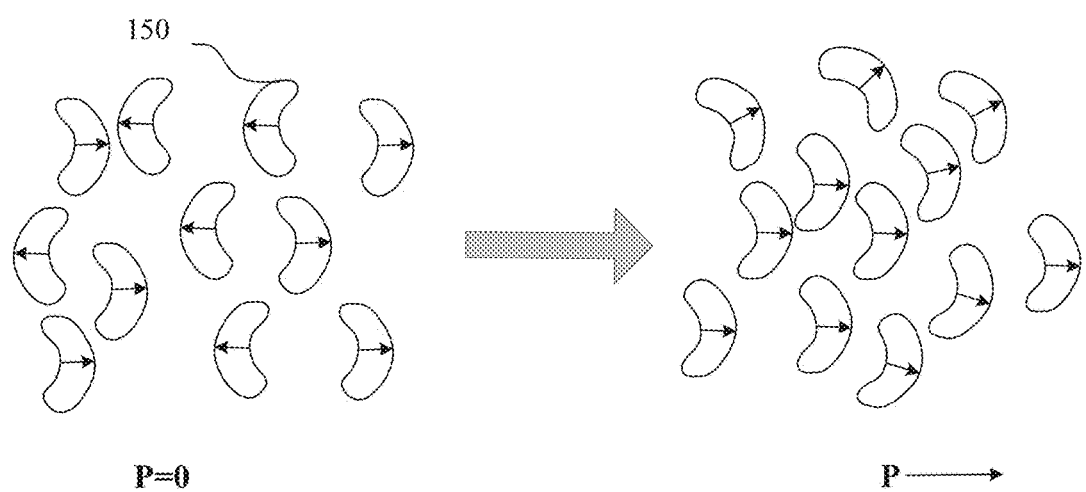
FIG. 1B is a schematic diagram illustrating spontaneous polarization of bend-shaped LC molecules under bend deformation.

LC molecules usually have permanent dipoles, but they do not exhibit spontaneous polarization because of equal probability for the dipoles to point to two opposite directions respectively. LCs are anisotropic dielectric media and their orientations can be changed by an externally applied field, such as an external electric field. The interaction energy between an externally applied electric field and the LCs is given by the following equation:

$$f_{dielectric} = \frac{1}{2}\Delta\varepsilon(\vec{E}\cdot\vec{n})^2, \qquad (1)$$

where $\Delta\varepsilon$ is the dielectric anisotropy of the LCs, $\vec{n}$ is the LC director pointing in the direction of the average molecular orientation, and $\vec{E}$ is the externally applied electric field intensity. According to the Eq. (1), the interaction energy $f_{dielectric}$ is insensitive to the polarity of the electric field. However, for the LC molecules that do not have a perfect rod-shaped structure but have either a bend-shaped or a pear-shaped structure, when the LC orientations are not uniform in space, their dipoles may point to the same direction and thus, a spontaneous polarization (also referred to as a flexoelectric polarization) may be produced and given by the following equation:

$$\vec{P}_{flexoelectric} = e_s\vec{n}(\nabla\cdot\vec{n}) + e_b\vec{n}\times\nabla\times\vec{n}, \qquad (2)$$

where $e_s$ and $e_b$ are splay and bend flexoelectric coefficients, respectively. FIG. 1A illustrates that pear-shaped LC molecules 100 with longitudinal dipoles may exhibit spontaneous polarization under splay deformation. FIG. 1B illustrates that bend-shaped LC molecules 150 with longitudinal dipoles may exhibit spontaneous polarization under bend deformation. The interaction energy of the spontaneous polarization and the externally applied electric field is described by the following equation:

$$f_{flexoelectric} = -\vec{P}_{flexoelectric}\cdot\vec{E} = -[e_s\vec{n}(\nabla\cdot\vec{n}) + e_b\vec{n}\times\nabla\times\vec{n}]\cdot\vec{E}. \qquad (3)$$

According to the above Eq. (3), the interaction energy $f_{flexoelectric}$ is sensitive to the polarity of the externally applied electric field, i.e., the polarity of the applied voltage.

The orientations of the LCs under the externally applied electric field are usually determined by both the dielectric effect and the flexoelectric effect, i.e., determined by both $f_{flexoelectric}$ and $f_{dielectric}$. However, when the dielectric effect is much stronger than the flexoelectric effect, the dielectric effect becomes the dominant effect to determine the orientations of the LCs. On contrary, when the flexoelectric effect is much stronger than the dielectric effect, the flexoelectric effect becomes the dominant effect to determine the orientations of the LCs. Theoretical study demonstrates that the flexoelectric effect itself becomes suppressed by increasing the dielectric anisotropy ($\Delta\varepsilon$) of the LCs and, in contrary, becomes enhanced by decreasing the dielectric anisotropy ($\Delta\varepsilon$) of the LCs.

The present disclosure provides a LC mixture that exhibits an enhanced flexoelectric effect under an externally applied electric field. The LC mixture may have a nematic phase at a room temperature. As used herein, "room temperature" means a temperature ranging from 15° C. to 40° C. both inclusive. A composition of the LC mixture may include a nematic host LC and one or more LC dimers dissolved as a guest in the host LC, where the host LC and the one or more LC dimers may have respective dielectric anisotropies of opposite signs in nematic phase. A weight percentage of the LC dimer in the LC mixture is designed in such a way that a net dielectric anisotropy of the LC mixture may significantly approach neutral, i.e., the net dielectric anisotropy $\Delta\varepsilon$ may significantly approach zero. The disclosed LC mixture may be used for an electro-optical element operated at a room temperature. The electro-optical element may be a pitch variable optical element where a pitch of flexoelectric domains (FDs) induced in the LC mixture in accordance with the present disclosure is electrically continuously variable.

The host LC may be the majority of the LC mixture, i.e., a weight percentage of the host LC in the LC mixture may be larger than 50%. The host LC may have a substantially low dielectric anisotropy ($\Delta\varepsilon$) in the nematic phase. In some embodiments, the host LC may be a positive LC material, i.e., the dielectric anisotropy ($\Delta\varepsilon$) of the host LC is positive. In some embodiments, the host LC may be a negative LC material, i.e., the dielectric anisotropy ($\Delta\varepsilon$) of the host LC is negative. In some embodiments, the host LC may be in the nematic phase at a room temperature, i.e., a temperature range of the nematic phase of the host LC may include the room temperature. Compounds and mixtures that are suitable as the host LC are to a large extent known and many of them are also commercially available.

LC dimers is a new type of LCs that possesses some unique properties, such as exhibiting a new type nematic phase called twist-bend nematic phase, having abnormal small bend elastic constant and possessing large flexoelectricity. The LC mixture in accordance with the present disclosure may include one or more LC dimers dissolved as a guest in the host LC. The one or more LC dimers may have a substantially low dielectric anisotropy ($\Delta\varepsilon$) in the nematic phase, and the dielectric anisotropy ($\Delta\varepsilon$) of the one or more LC dimers may have an opposite sign as that of the LC host in the nematic phase. For example, when the host LC is a positive LC material, the one or more LC dimers may be negative LC materials; and when the host LC is a negative LC material, the one or more LC dimers may be positive LC materials. In addition, the one or more LC dimers may have molecular structures that could promote the formation of the twist-bend nematic phase and large flexoelectricity at a room temperature, for example, a pear-shaped molecular structure exhibiting a large splay flexoelectric coefficient, a bent-shaped molecular structure exhibiting a large bend flexoelectric coefficient, a semi-flexible bent core molecular structure. Further, the one or more LC dimers may have a good solubility in the LC host. The weight percentage of the one or more LC dimers in the LC mixture may be determined by various factors, such as the solubility of the LC dimers in the LC mixture, the desired net dielectric anisotropy and desired flexoelectric coefficients of the LC mixture, etc. The net dielectric anisotropy and flexoelectric coefficients of the LC mixture may be adjustable by varying the weight percentages of the LC dimers in the LC mixture, however, the solubility of the LC dimers in the nematic host LC is desired to be considered.

Compounds and mixtures that are suitable as the one or more LC dimers that are dissolved as a guest in the host LC are to a large extent known and many of them are also commercially available. In some embodiments, the one or more LC dimers may include cyanobiphenyl-based LC dimer. In some embodiments, the cyanobiphenyl-based LC dimer may include a member of 1,ω-bis(4-cyanobiphenyl-4'-yl) alkane homologous series having the following chemical structure:

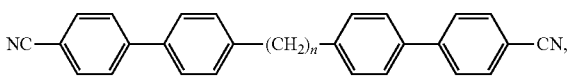

where two mesogenic units (i.e., cyanobiphenyl groups) are connected using a flexible linkage consisting of an alkyl chain. 1,ω-bis(4-cyanobiphenyl-4'-yl) alkane homologous series is referred to using an acronym CBnCB, where CB denotes cyanobiphenyl and n denotes a number of methylene units in the flexible linkage. An odd-numbered member of CBnCB may have a molecular structure, where the two cyanobiphenyl groups at the two ends are connected via the alkyl chain with an odd number of carbons and are inclined at some angle with respect to each other. That is, an odd-numbered member of CBnCB may have a bent molecular shape, and such a conformation facilitates a large bend flexoelectric coefficient. An even-numbered member of CBnCB may have a molecular structure where the long axes of the two cyanobiphenyl groups at the two ends are parallel to each other. That is, an even-numbered member of CBnCB may have a linear molecular shape, and the bend flexoelectric coefficient of the even-numbered members of CBnCB may be suppressed as compared to the that of the odd-numbered members of CBnCB.

CB7CB, CB9CB and CB11CB are examples of odd-membered LC dimers. CB7CB has the following molecular structure:

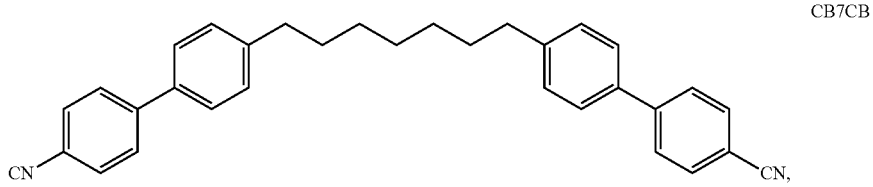

CB7CB where the two cyanobiphenyl groups at the two ends are connected via the alkyl chain with seven carbons and are inclined at some angle with respect to each other. CB9CB has the following molecular structure:

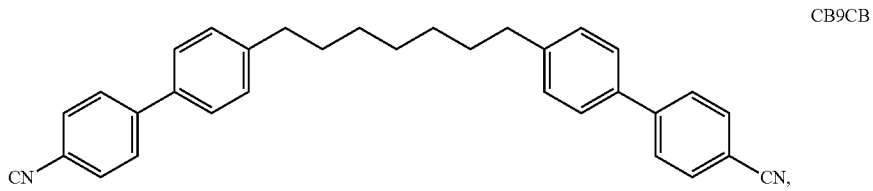

CB9CB which is similar to that of CB9CB except the alkyl chain consists of nine carbons. A large bend flexoelectric coefficient $e_b$ of about −31 pC/m was reported for the LC dimer CB7CB, and a similar bend flexoelectric coefficient is expected for the LC dimer CB9CB. CB7CB and CB9CB also have a similar positive dielectric anisotropy ($\Delta\varepsilon$) of about 2.

The LC mixture in accordance with the present disclosure may be prepared in a manner known per se, for example, heating a mixture of the host LC and the one or more LC dimer to a temperature approximately above the clearing point, then cooling the mixture to the room temperature. For discussion purposes, an LC mixture in accordance with the present disclosure (referred to as LC mixture A) was prepared by mixing HNG7267 ($\Delta\varepsilon$=−1.9, $\Delta n$=0.15, from Jiangsu Hecheng Display Technology Co., Ltd (HCCH)) as the host LC with CB7CB and CB9CB as the LC dimers, where weight percentages of the host LC and LC dimers in the LC mixture A are about 70% and 30%, respectively. Both CB7CB and CB9CB were doped into the host LC to enhance the solubility of the LC dimers in the nematic host LC. The LC mixture A was measured to have a negative dielectric anisotropy ($\Delta\varepsilon$) of about −0.2 at a room temperature, which is substantially neutral. The bend flexoelectric coefficient of the LC mixture A is about −10 pC/m.

The LC mixture in accordance with the present disclosure may exhibit unique optical properties at a room temperature, such as light diffraction, electrically tunable pitch of diffraction structures, electrically tunable diffraction angle and electrically tunable diffraction efficiency after filled into a suitable LC cell and applied with a suitable external driving voltage. The production of an LC cell containing an LC mixture in accordance with the present disclosure may be carried out in a manner known per se, for example, by evacuating the LC cell and introducing the LC mixture into the evacuated LC cell.

Figure 2A:
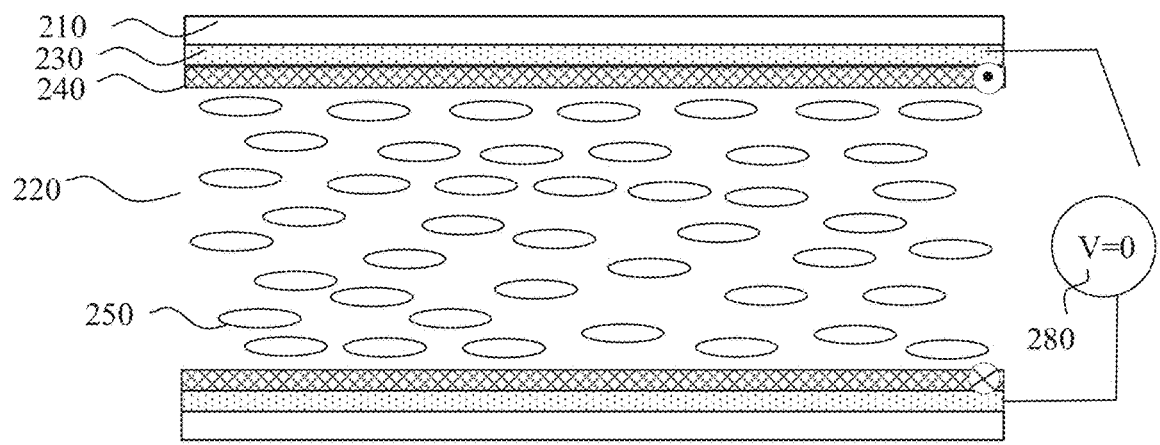
FIG. 2A is a schematic diagram illustrating a cross-section of an LC cell containing an LC mixture, according to an embodiment of the present disclosure.

FIG. 2A illustrates a cross-section of an LC cell 200 containing an LC mixture according to an embodiment of the present disclosure. As shown in FIG. 2A, the LC cell 200 may include two opposite substrates 210 and an LC mixture layer 220 sandwiched between the two substrates 210. The LC mixture layer 220 may be a thin film of an LC mixture in accordance with an embodiment of the present disclosure. The substrates 210 may provide support and protection to the LC mixture layer 220. The substrates 210 may be substantially transparent in the visible band (about 380 nm to about 700 nm). In some embodiments, the substrates 210 may also be transparent in some or all of the infrared (IR) band (about 700 nm to about 1 mm). The substrate 210 may include a suitable material that is substantially transparent to the light of above-listed wavelengths range, e.g., glass, plastic, sapphire, etc. A conductive electrode 230 such as an indium tin oxide (ITO) electrode may be disposed on opposing surfaces of the substrates 210 to apply a driving voltage by a power source 280 to the LC cell 200. The driving voltage may be a direct current (DC) voltage or an ultra-low frequency alternating current (AC) voltage (e.g., 0.01 Hz AC voltage). All such alternative usages of the power source are within the scope to the present disclosure. The conductive electrode 230 may be, for example, a continuous planar electrode, a patterned planar electrode, or a protrusion electrode. An alignment layer 240 may be disposed on opposing surfaces of the conductive electrodes 230, and the LC mixture layer 220 may be sandwiched between the two alignment layers 240. The alignment layers 240 may provide an original alignment to LC molecules 250 in the LC mixture layer 220. The various materials of the alignment layers 240, and the alignment direction and strength, may cause the LC molecules 250 at the boundaries to have different original alignments. In some embodiments, the conductive electrodes 230 each may be covered with an insulated layer of, for example, $SiO_2$, to prevent the injection of charge carriers through the conductive electrode 230. In one embodiment, as shown in FIG. 2A, the conductive electrode 230 may be a continuous planar electrode, and the two alignment layers 240 may be configured with homogeneous anti-parallel alignment directions, respectively, for example, in +y-direction and −y-direction, respectively, through which the LC molecules 250 may be oriented in an anti-parallel direction at a voltage-off state (V=0).

Figure 2B:
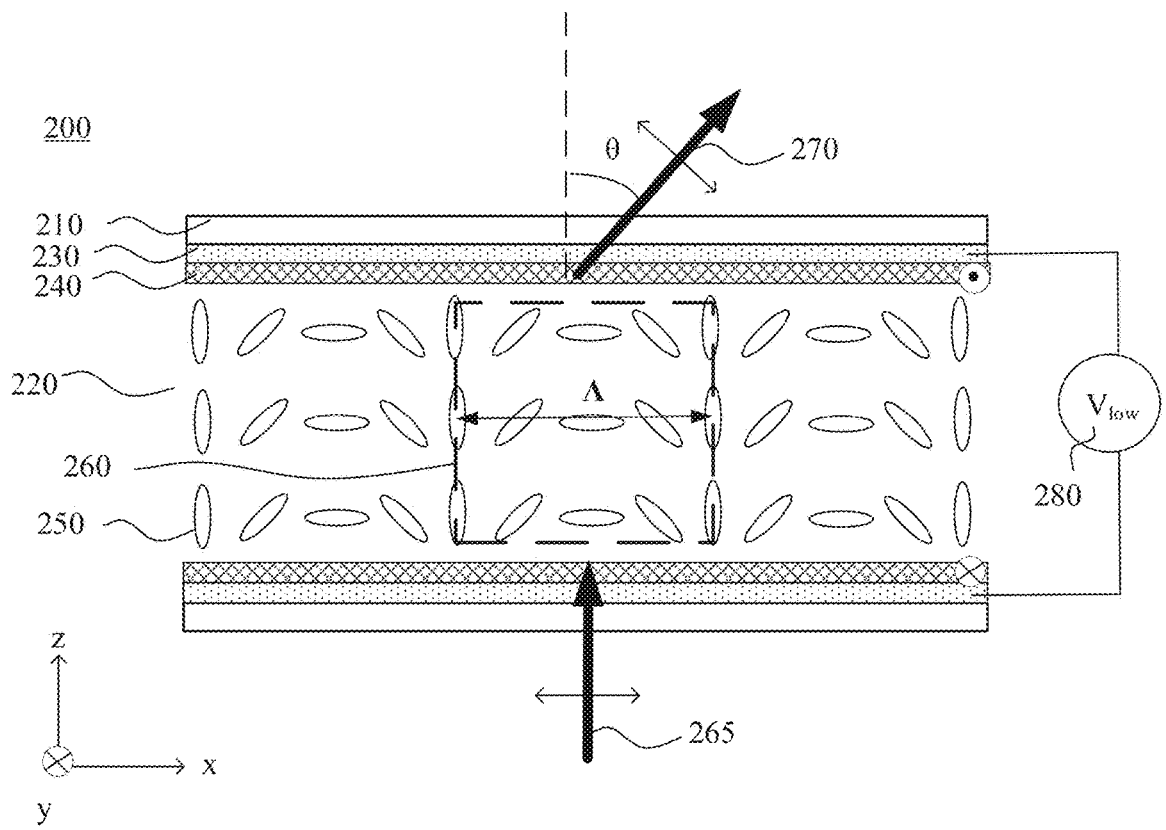
FIG. 2B is a schematic diagram illustrating flexoelectric domains (FDs) induced in the LC cell in FIG. 2A under a relatively low driving voltage, according to an embodiment of the present disclosure.
Figure 2C:
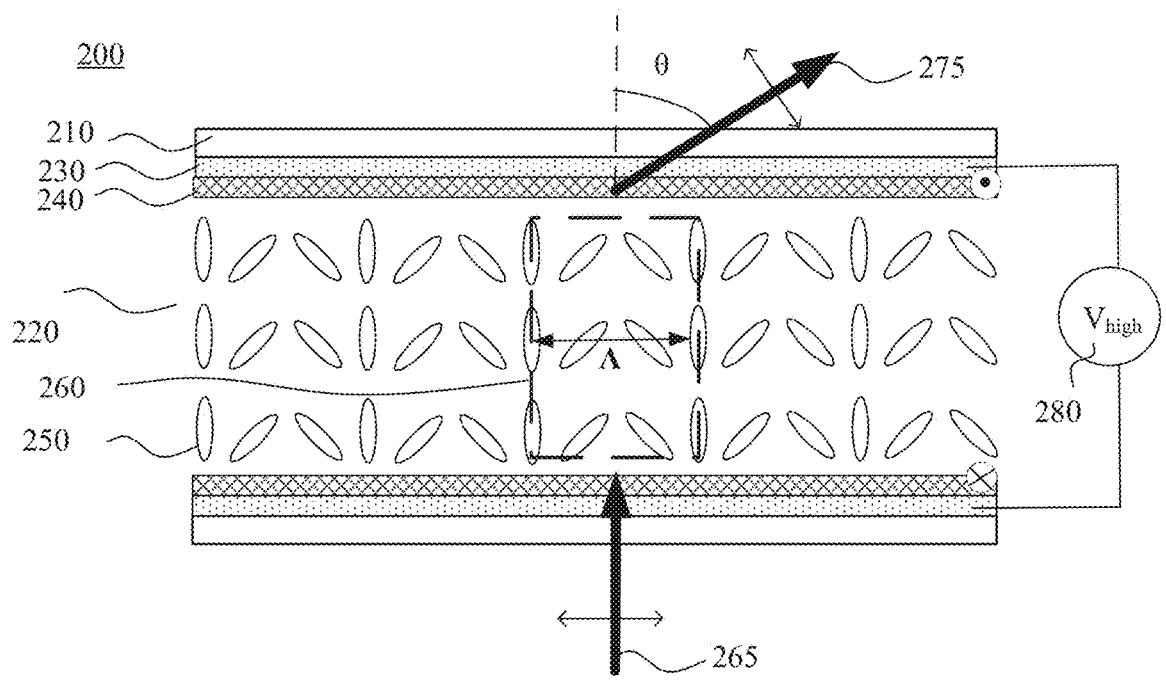
FIG. 2C is a schematic diagram illustrating FDs induced in the LC cell in FIG. 2A under a relatively high driving voltage, according to an embodiment of the present disclosure.

FIG. 2B and FIG. 2C illustrate orientations of the LC molecules 250 at a voltage-on state under different driving voltages provided by the power source 280. The driving voltage V of the power source 280 is applied on the two conductive electrodes 230, and an electric field along the z-direction is generated. As shown in FIG. 2B, a plurality of flexodomains (FDs) 260 may begin to be induced in the LC mixture layer 220 as the driving voltage V exceeds a threshold value. For illustrative purposes, FIG. 2B shows three FDs 260, and a single FD 260 is denoted by a dashed box. The FDs 260 are a kind of electric field induced deformation that appears solely due to the flexoelectric effect. The emergence of the FDs in the LC mixture layer 220 may be related to various factors, such as the amplitude and frequency of the driving voltage, the operating temperature, etc. The structures of the FDs 260 may be similar to an optical grating. As shown in FIG. 2B, the FDs 260 induced in the LC mixture layer 220 may be arranged in a spatially periodic pattern with a uniform pitch (or period) A, and a single FD 260 may extend parallel to the original alignment direction (e.g., y-direction in FIG. 2B). That is, a length direction of the single FD 260 may be parallel to the original alignment direction (e.g., y-direction in FIG. 2B). The azimuth angles ($\varphi$) of the LC molecules 250 may be changed in a linearly repetitive pattern from a center to an edge of the LC mixture layer 220, with the uniform pitch (or period) A. The pitch A may be the size along the width direction (e.g., x-direction) of a single FD 260, or the pitch A may be the distance along the x-direction between repeated portions of the pattern. The pitch A may determine, in part, the optical properties of the optical grating consisting of the FDs 260. For example, the pitch A may determine the diffraction angles of an incident light beam. Generally, the smaller the pitch A, the larger the diffraction angle for a designed wavelength.

It is to be noted that, the LC cell 200 may be polarization selective. The LC cell 200 may selectively diffract a light beam having a first polarization but transmit a light beam having a second polarization with negligible diffraction. For example, as shown in FIG. 2B, a light beam 265 linearly polarized in the alignment direction (e.g., x-direction in FIG. 2B) may experience a periodic refractive index modulation as propagating through the LC cell 200 and, thus, may be diffracted by the LC cell 200. For illustrative purposes, FIG. 2B shows a +$1^{st}$ order diffraction of the light beam 260, where a diffraction angle θ is an angle between a diffracted light beam 270 and the normal of the light incident surface. A light beam linearly polarized in direction (e.g., y-direction in FIG. 2B) perpendicular to the alignment direction may experience a uniform refractive index as propagating through the LC cell 200 and, thus, may be transmitted through with negligible diffraction. In some embodiments, a linearly polarizer may be optically coupled to the LC cell 200, such that the light beam incident onto the LC cell 200 may have a desired polarization that matches the requirements of the LC cell 200.

The structures of the FDs 260 induced in the LC mixture layer 220 may be controlled by various factors, such as the amplitude and frequency of the driving voltage provided by the power source 280, the operating temperature, etc. As shown in FIG. 2C, as the amplitude of the driving voltage increases (the driving voltage is $V_{high}$ in FIG. 2C as compared to the driving voltage $V_{low}$ in FIG. 2B), the pitch A of the FDs 260 induced in the LC mixture layer 220 may decrease. Accordingly, the diffraction angle may increase. For illustrative purposes, FIG. 2C shows a +$1^{st}$ order diffraction of the light beam 260, where the diffraction angle θ is an angle between a diffracted light beam 275 and the normal of the light incident surface. The diffraction angle θ in FIG. 2C obviously increases as compared to that in FIG. 2B. As the amplitude of the driving voltage continuously increases, the pitch A of the FDs 260 induced in the LC mixture layer 220 may continuously decrease. That is, the pitch A of the optical grating consisting of the FDs 260 may be continuously adjustable by an externally applied voltage. Accordingly, the diffraction angle of a light beam incident onto the optical grating consisting of the FDs 260 may be continuously adjustable by an externally applied voltage. The continuously adjustable pitch may have a great potential for important and extended applications of optical gratings.

Figure 3A:
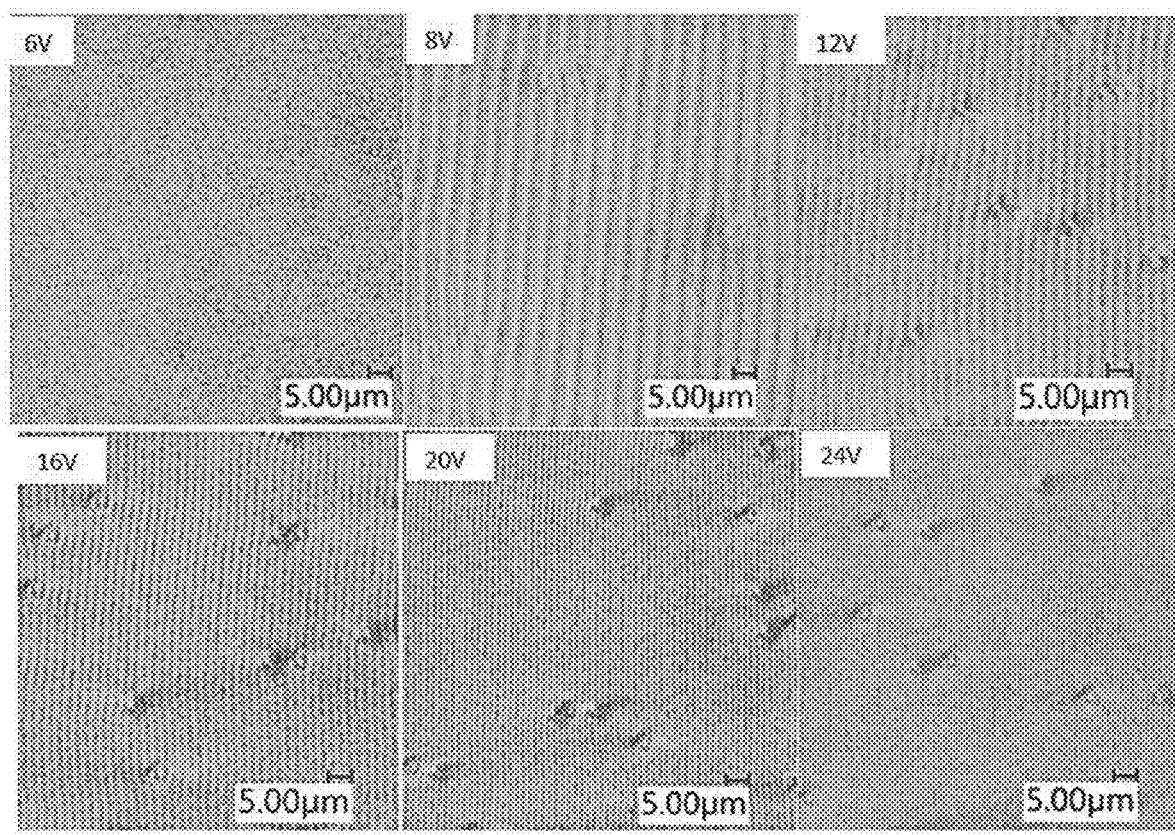
FIG. 3A is a group of photomicrographs illustrating an LC cell filled with an LC mixture under different driving voltages, according to an embodiment of the present disclosure.
Figure 3B:
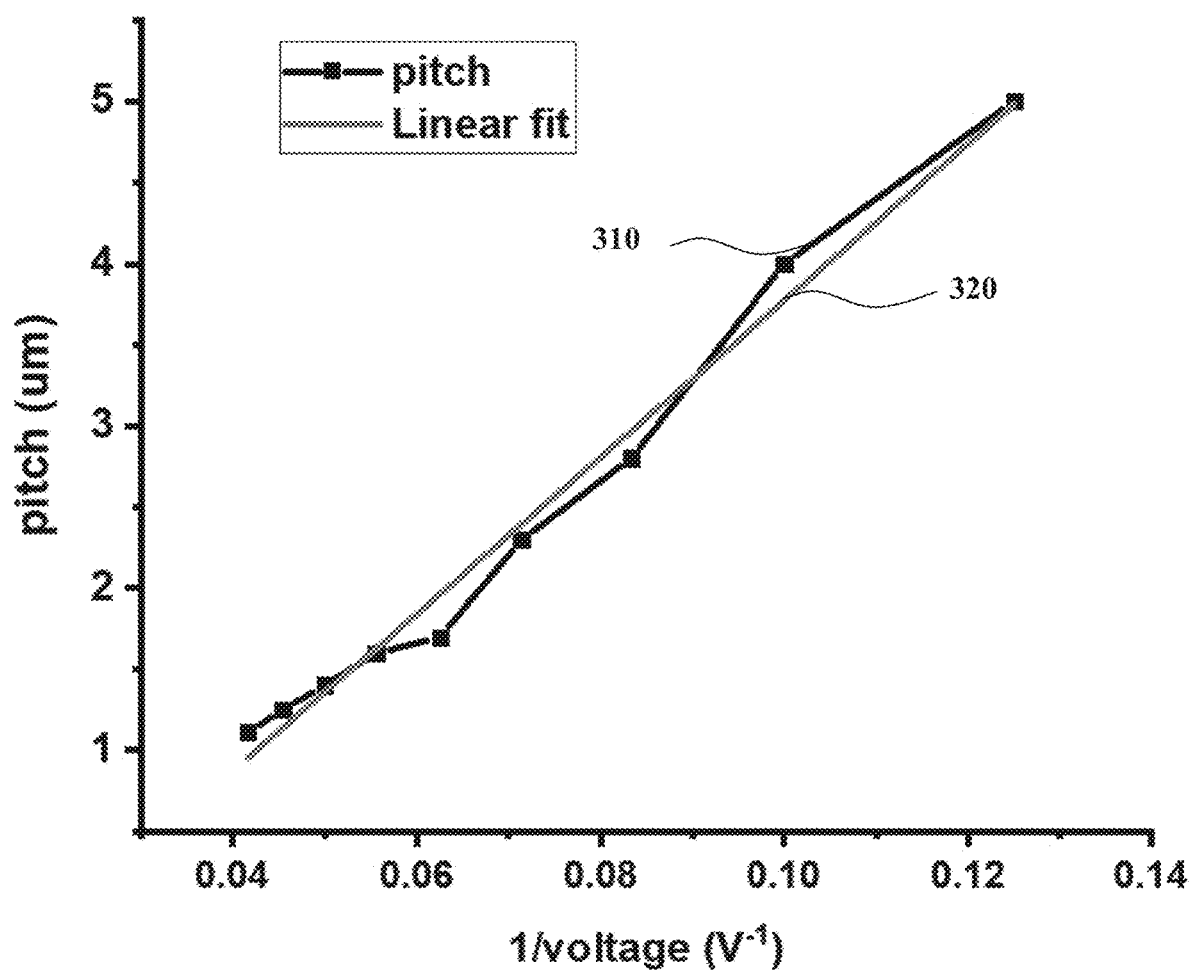
FIG. 3B is a schematic diagram illustrating a relationship between a pitch of FDs induced in the LC cell in FIG. 3A and an amplitude of the driving voltage, according to an embodiment of the present disclosure.

The pitch A of the FDs 260 induced in the LC mixture layer 220 may be on a micrometer (μm) scale and may be observed under a polarizing microscope (POM). FIG. 3A illustrates photomicrographs of an LC cell filled with the LC mixture A under different driving voltages. The LC cell may have a cell structure shown in FIG. 2A. The cell gap is about 3.7 μm, and the operating temperature is room temperature. The photomicrographs are taken under POM with the LC cell arranged between two crossed polarizers. As shown in FIG. 3A, the morphology of the FDs induced in the LC mixture A is changing as the driving voltage applied to the LC cell varies. FDs are not observed in the LC mixture A as the driving voltage gradually increases from 0V to 6V. As the driving voltage increases to 8V, the FDs are observed to be induced in the LC mixture A, where the FDs manifest themselves as a spatially periodic array of bright and dark stripes parallel to the initial LC director alignment direction under the POM. The pitch A of the FDs is about 5 μm. As the amplitude of the driving voltage further increases, the pitch A of the FDs in the LC mixture A obviously decrease, for example, decreases to about 2.7 μm, 1.7 μm, 1.5 μm and 1.1 μm as the driving voltage increases to 12V, 16V, 20V and 24V, respectively. FIG. 3B illustrates a relationship between the pitch A of the FDs induced in the LC mixture A and the amplitude of the driving voltage. As shown by a curve 310 in FIG. 3B, the pitch A of the FDs induced in the LC mixture A has a substantially linear relationship with the reciprocal of the amplitude of the driving voltage. A linear fitting is also conducted between the pitch A and the reciprocal of various amplitude of the driving voltage, as shown by a curve 320 in FIG. 3B, which substantially matches the curve 310.

Figure 4:
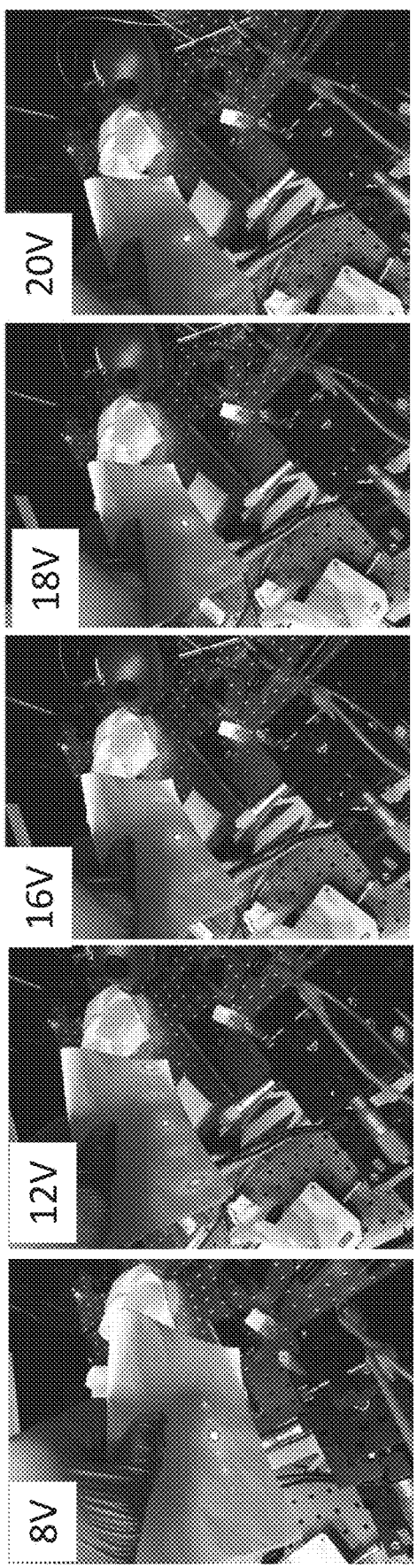
FIG. 4 is a group of images illustrating laser diffraction spots produced by the LC cell in FIG. 3A under different driving voltages, according to an embodiment of the present disclosure.

As discussed above, the structures of FDs induced in the LC mixture are similar to optical grating and, thus, the FDs may generate laser diffraction spots when an incident laser beam satisfies a certain diffraction condition, e.g., Bragg condition. FIG. 4 illustrates images of laser diffraction spots produced by the LC cell in FIG. 3A under different driving voltages. A paper is used as a screen for the diffraction spots to be displayed on, and a camera placed at a fixed position is used to capture various images of the screen showing the diffraction spots. Referring to FIG. 3A and FIG. 4, as the driving voltage increase to 8V, diffraction spots are present as the optical grating consists of the FDs appears, and the diffraction spots generated by the $0^{th}$, $\pm 1^{st}$ order, $\pm 2^{nd}$ order and $\pm 3^{rd}$ order diffraction are observed and captured by the camera. As the driving voltage increases from 8V to 20V, the pitch A gradually decreases and, thus, the diffraction angles gradually increases. Provided the distance between the screen and the LC cell is constant, the distance between the 0th diffraction spot and a non-zero order diffraction spot may gradually increase as the diffraction angle of the non-zero order diffraction gradually increases. For example, when the driving voltage is 12V, the diffraction spots of the $\pm 3^{rd}$ order diffraction are out of the camera's view, and only the diffraction spots of the $0^{th}$, $\pm 1^{st}$ order, and $\pm 2^{nd}$ order diffraction are observed. When the driving voltage is 16V, the diffraction spots of the $2^{nd}$ order and $\pm 3^{rd}$ order diffraction are out of the camera's view ultimately with a decrease in the pitch A, and only the diffraction spots of the $0^{th}$ and $\pm 1^{st}$ order diffraction are observed.

Referring to FIGS. 2A-2B, FIGS. 3A-3B and FIG. 4, the LC cell 200 filled with an LC mixture in accordance with the present discourse (e.g., the LC mixture A) may function as an optical grating formed by spatially periodic arranged FDs, where the pitch of the optical grating (or the pitch of the spatially periodic arranged FDs) may be electrically continuously tunable and, accordingly, the diffraction angle of an incident light beam may be may be electrically continuously tunable. Such an optical element with continuously variable pitch may have significant potential applications for manipulating light beams, such as diffraction optics, laser displays, beam shaping or steering, switchable holograms, and adaptive microdevices.

Figure 5A:
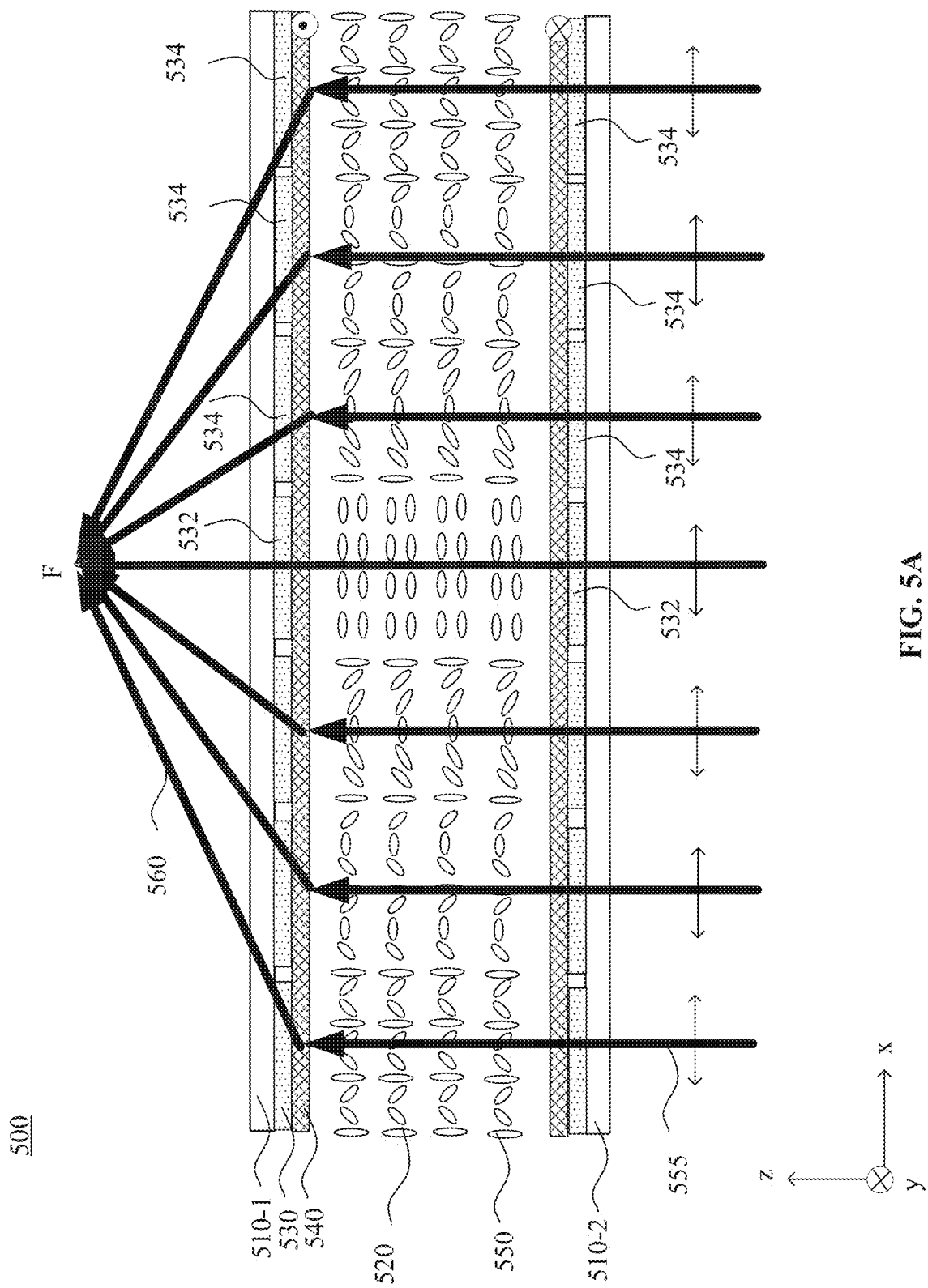
FIG. 5A is a schematic diagram illustrating a cross-section of an LC cell containing an LC mixture, according to another embodiment of the disclosure.
Figure 5B:
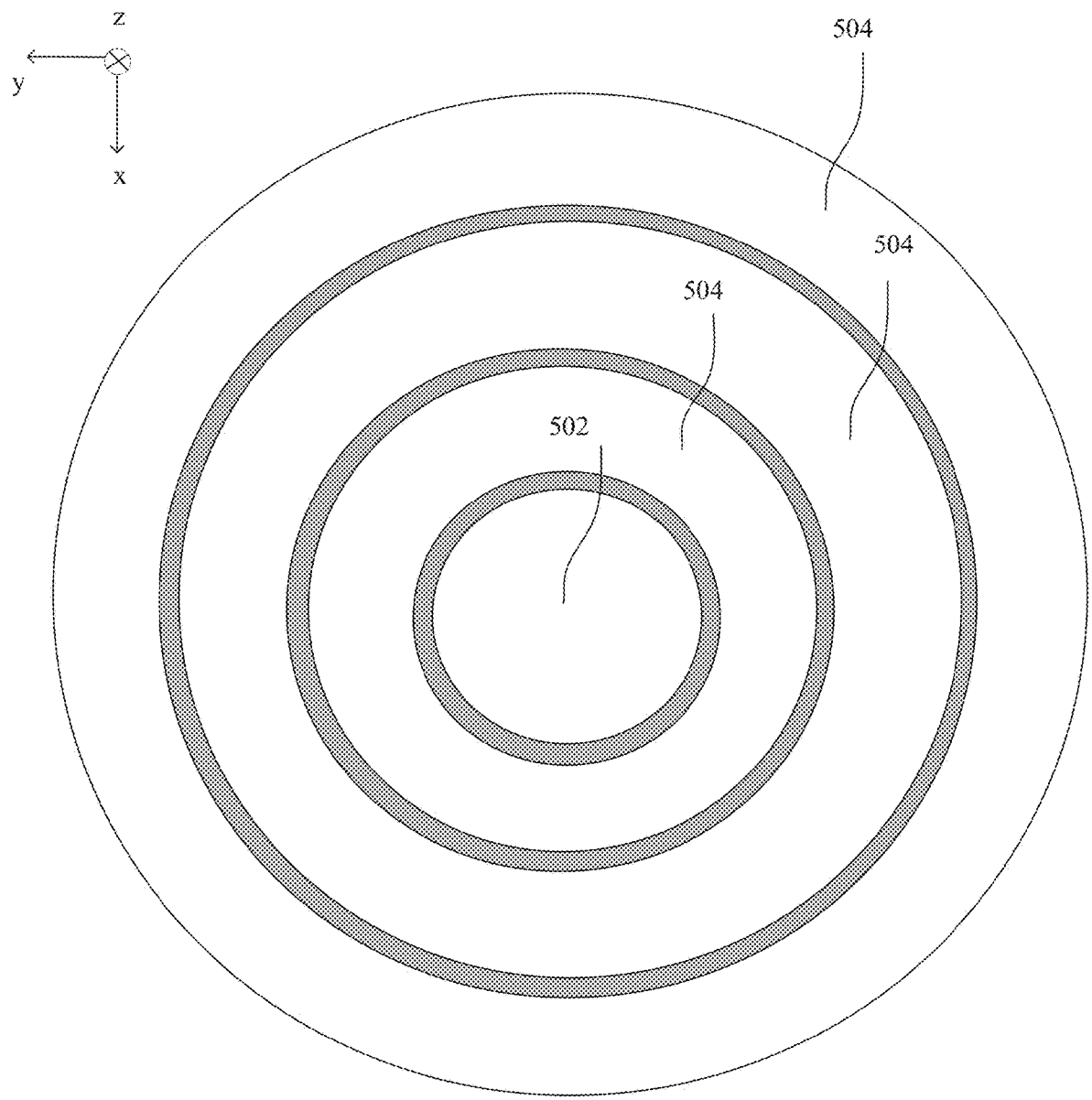
FIG. 5B is a schematic diagram illustrating a top view of the LC cell in FIG. 5A, according to an embodiment of the present disclosure.

FIG. 5A illustrates a cross-section of an LC cell 500 containing an LC mixture, according to another embodiment of the present disclosure, and FIG. 5B illustrates a top view of the LC cell 500 in FIG. 5A. The LC cell 500 may function as a diffractive lens 500. The similarities between FIG. 5A and FIGS. 2A-2C are not repeated here, while certain difference may be explained. As shown in FIG. 5A, the LC cell 500 may include a first substrate 510-1 and a second substrate 510-2 arranged opposite to each other, and an LC mixture layer 520 sandwiched between the two substrates 510. The LC mixture layer 520 may be a thin film of an LC mixture in accordance with an embodiment of the present disclosure. The first and second substrates 510 each may be provided with a transparent conductive electrode 530 and an alignment layer 540, where the LC mixture layer 520 is sandwiched between the two alignment layers 540. The alignment layers 540 may be configured with a homogeneous anti-parallel alignment direction, for example, in a y-direction in FIG. 5A, through which LC molecules 550 may be oriented in an anti-parallel direction at a voltage-off state (V=0, not drawn in FIG. 5A). Each conductive electrode 530 may be a patterned electrode that includes a plurality of sub-electrodes. The sub-electrodes may include a center electrode 532 and a plurality of concentric ring electrodes 534 surrounding the center electrode 532. In some embodiments, the center electrode 532 may be a circular electrode. Correspondingly, the LC cell 500 may include a plurality of resets that are one-to-one corresponding to the plurality of sub-electrodes, where the resets of the LC cell 500 may include a center reset 502 and a plurality of concentric ring-shaped resets 504 of increasing radii surrounding the center reset 502, as FIG. 5B shows.

Returning to FIG. 5A, the sub-electrodes on the first substrate 510-1 may be applied with a uniform driving voltage, for example, may be grounded. The amplitudes of the driving voltages applied to the sub-electrodes on the second substrate 510-2 may be progressively decreased from an outermost concentric ring electrode 534 to an innermost concentric ring electrode 534 or the center electrode 532. The center electrode 532 on the second substrate 510-2 may be applied with the same driving voltage as the sub-electrodes on the first substrate 510-1, for example, may be grounded. As discussed in FIGS. 2A-2C, the pitch of an optical grating formed by FDs may decrease as the driving voltage increases. Thus, referring to FIGS. 5A-5B, when the amplitudes of the driving voltages applied to the sub-electrodes on the second substrate 510-2 are progressively decreased from the outermost concentric ring electrode 534 to the center electrode 532, the pitch of the optical grating formed by FDs may be increased from an outermost ring-shaped reset 504 to the center reset 502 of the LC cell 500. Accordingly, the diffraction angle of a same diffraction order of an incident light beam with a desired polarization may be decreased from the outermost ring-shaped reset 504 to the center reset 502 of the LC cell 500. By individually controlling the amplitudes of the driving voltages applied to the sub-electrodes 534 on the second substrate 510-2, the diffracted light beams from the plurality of resets of the LC cell 500 may be focused, allowing the LC cell 500 to function as a diffractive lens 500. For example, when light beams 555 linearly polarized in the alignment direction of the LC molecules 550 (e.g., x-direction in FIG. 5A) is substantially normally incident onto the LC cell 500, the diffraction angles of the $\pm 1^{st}$ order diffracted light beams 560 may be decreased from the outermost ring-shaped reset 504 to the center reset 502 of the LC cell 500, such that the $\pm 1^{st}$ order diffracted light beams 560 may get focused to a point F.

It is to be noted that the LC cell 500 may allow a single incident light beam to be simultaneously focused at several positions along the propagation axis. When the diffraction efficiency decreases as the diffraction order increases, focal spots of the higher order diffracted light beams may be not visually observable. In addition, because the sub-electrodes on the first substrate 510-1 are applied with a uniform driving voltage, in some embodiments, the transparent conductive electrode 530 on the first substrate 510-1 may be configured as a uniform planar electrode applied with a uniform driving voltage, for example, may be grounded. That is, at least one of the transparent conductive electrodes 530 on the first substrate 510-1 and second substrate 510-2 may be desired to a patterned electrodes including a plurality of sub-electrodes.

Further, the focal length or the optical power of the diffractive lens 500 may be adjustable by varying the amplitudes of the driving voltages applied to the respective sub-electrodes on the second substrate 510-2. For example, through gradually increasing the amplitude of the driving voltage applied to the respective concentric ring electrodes on the second substrate 510-2, the pitch of the optical grating formed by FDs in the respective resets of the LC cell 500 may gradually decease and, accordingly, the diffraction angle may increase. Thus, the focal length of the diffractive lens 500 may be decreased. On the contrary, through gradually decreasing the amplitude of the driving voltage applied to the respective concentric ring electrodes on the second substrate 510-2, the pitch of the optical grating formed by FDs in the respective resets of the LC cell 500 may gradually increase and, accordingly, the diffraction angle may decrease. Thus, the focal length of the diffractive lens 500 may be increased.

In some embodiments, at least one of the transparent conductive electrode 530 on the first substrate 510-1 (referred to as a first electrode) and the transparent conductive electrode 530 on the second substrate 510-2 (referred to as a second electrode) may include a plurality of sub-electrodes. The driving voltage may spatially vary across the sub-electrodes of the at least one of the first electrode and the second electrode, and the driving voltage may be spatially uniform across the remaining one of the of the first electrode and the second electrode, which may allow for arbitrary deflection patterns in addition to the lens-like deflection pattern in FIG. 5A.

It is to be noted that the use of the LC mixtures in accordance with the present disclosure to realize a tunable optical grating and a diffractive lens are merely for illustrative purposes and is not intended to limit the scope of the present disclosure. The tunable optical grating and the diffractive lens are merely examples of pitch variable optical elements where the pitch of the FDs induced in the LC mixture in accordance with the present disclosure is electrically continuously variable. The LC mixtures in accordance with the present disclosure may be configured to realize other pitch variable optical elements where the pitch of the FDs induced in the LC mixture is electrically continuously variable, such as a tunable prism, which is not limited by the present disclosure. Further, the pitch variable optical elements containing the LC mixtures in accordance with the present disclosure may have numerous applications in a large variety of fields, which are all in the scope of the present disclosure. Some exemplary applications in augmented reality (AR), virtual reality (VR) and mixed reality (MR) fields will be explained below.

Figure 6A:
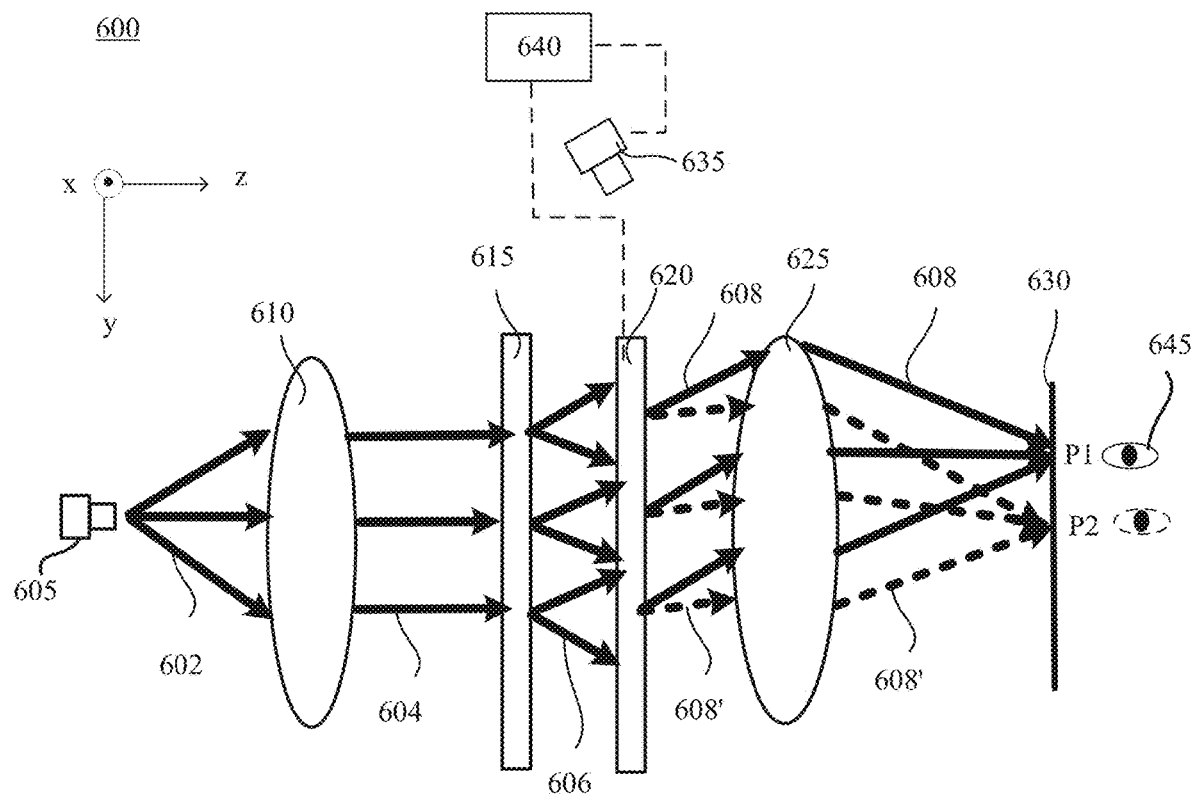
FIG. 6A is a schematic diagram illustrating a schematic diagram of an optical assembly including a pitch variable optical element, according to an embodiment of the present disclosure.

FIG. 6A illustrates a schematic diagram of an optical assembly 600 including a pitch variable optical element 620, according to an embodiment of the present disclosure. The pitch variable optical element 620 may be a tunable optical grating that provides a continuous beam steering. The optical assembly 600 may be a part of a near-eye display (NED) and may enable the pupil steering of the NED for AR, VR or MR applications. As shown in FIG. 6A, the optical assembly 600 may include a light source 605, a first optical lens 610, an optical diffuser 615, a tunable optical grating 620 and a second optical lens 625 arranged in an exemplary optical series shown. It should be appreciated by those skilled in the art that the optical elements described in the above optical assembly may be configured in different sequence in the optical series, and such different configurations are all within the scope of the present disclosure. Optical series refers to relative positioning of a plurality of optical elements, such that light, for each optical element of the plurality of optical elements, is transmitted by that optical element before being transmitted by another optical element of the plurality of optical elements. Moreover, ordering of the optical elements does not matter. For example, optical element A placed before optical element B, or optical element B placed before optical element A, are both in optical series. Similar to electric circuitry design, optical series represents optical elements with their optical properties compounded when placed in series.

Referring to FIG. 6A, the optical assembly 600 may further include an eye-tracking device 635 and a controller 640. The controller 640 may be electrically coupled with one or more of the other devices, such as the eye-tracking device 635 and the tunable optical grating 620. The optical assembly 600 may include other elements, which are not limited by the present disclosure. The light source 605 may include a point light source configured to generate coherent or partially coherent light that is converging or diverging. The light source 605 may include, e.g., a laser diode, a fiber laser, a vertical cavity surface emitting laser, and/or a light emitting diode. In some embodiments, the light source 605 may be a component included in the optical assembly 600. In some embodiments, the light source 605 may be part of some other optical assembly or other system that generates coherent or partially coherent light. In some embodiments, the optical assembly 600 may further include one or more optical components that condition the light generated by the light source 605. Conditioning light from the light source 605 may include, e.g., polarizing, and/or adjusting orientation in accordance with instructions from a controller of the light source 605. In some embodiments, the light source 605 may include a single optical fiber that is coupled to three laser diodes emitting red, green and blue light, respectively, for example, having a central wavelength of about 448 nm, 524 nm, and 638 nm, respectively. The light beam generated by the light source 605 may be linearly polarized to match the requirement of the tunable optical grating 620.

The first optical lens 610, the optical diffuser 615, the tunable optical grating 620 and the second optical lens 625 arranged in optical series may direct the light generated by the light source 605 towards an eye-box 630 of the optical assembly 600. The first optical lens 610 may be arranged relative to the light source 605, such that the first optical lens 610 may convert a divergent light beam 602 output from the light source 605 to be a collimated light beam 604 that propagates towards the optical diffuser 615. The optical diffuser 615 may primarily forward scatter the collimated light beam 604 to a plurality of scattered light beams 606 towards the tunable optical grating 620. The optical diffuser 615 may diffuse an incident light beam uniformly in a plurality of desired directions, by which the field of view (FOV) of the optical assembly 600 may be enhanced. The optical diffuser 615 may include any suitable optical diffusers, such as a glass diffuser, or a holographic diffuser, etc. In some embodiments, the optical diffuser 615 may be a holographic diffuser 615, and the functions of the holographic diffuser 615 may be provided, for example, by a holographic optical element (HOE) that is produced at a thin film of holographic materials, i.e., a holographic film, via a holographic recording. The HOE may be configured with a plurality of grating structures (e.g., Bragg grating structures) in the holographic recording, and the obtained holographic diffuser 615 may diffuse a light beam primarily by Bragg diffraction (i.e., diffract a light beam that satisfies the Bragg condition). The holographic diffuser 615 may be highly efficient at diffusing a light that satisfies the Bragg condition. In some embodiments, the holographic diffuser 615 may include a polarization insensitive Bragg grating that is holographically recorded at an isotropic recording material. In some embodiments, the holographic diffuser 615 may include a polarization volume grating (PVG) that is holographically recorded at a polarization sensitive recording material. In some embodiments, to broaden a wavelength spectrum of the holographic diffuser 615 (e.g., to diffract a collimated incident light beam in various visible wavelengths), wavelength multiplexing for full-color recording may be used in the holographic recording.

The tunable optical grating 620 may steer the scattered light beams 606 that satisfy a diffraction condition (e.g., Bragg condition) to diffracted light beams 608 via diffraction, and the second optical lens 625 may focus the diffracted light beam 608 to one or more light spots at a surface where an exit pupil of the optical assembly 600 (or an exit pupil of a NED including the optical assembly 600) is located. An exit pupil may be a location where an eye pupil 645 of a user is positioned at the eye-box 630 region when the user wears the NED. The one or more light spots may be considered as one or more exit pupils available at the eye-box 630 region. When one of the one or more exit pupils available at the eye-box 730 region substantially coincides with the position of the eye pupil 645, the light beam 602 outputted from the light source 605 may be finally directed to the eye pupil 645.

The tunable optical grating 620 may be an embodiment of the LC cell 200 described in association with FIGS. 2A to 2C. The tunable optical grating 620 may have a continuously adjustable pitch of the induced FDs in the LC mixture and, accordingly, a continuously adjustable diffraction angle of an incident light beam as the driving voltage continuously changes. In some embodiments, the tunable optical grating 620 may provide a plurality of steering states to an incident light beam in accordance with instructions from the controller 640. The tunable optical grating 620 may be electrically switchable among the plurality of steering states by switching the driving voltage. The plurality of steering states may result in a plurality of steering angles of the incident light beam, where the plurality of steering angles may be continuous. That is, the tunable optical grating 620 may provide a continuous adjustment range of a steering angle to an incident light beam, which may enable a continuous shift of the exit pupil of the optical assembly 600.

Continuously referring to FIG. 6A, the eye-tracking device 635 may provide eye-tracking information, based on which the position of the eye pupil 645 may be determined and, accordingly, the steering state of the tunable optical grating 620 may be determined. Any suitable eye-tracking device 635 may be used. The eye-tracking device 635 may include, e.g., one or more sources that illuminate one or both eyes of the user, and one or more cameras that capture images of one or both eyes of the user. The eye-tracking device 635 may be configured to track a position, a movement, and/or a viewing direction of the eye pupil 645 of the user. In some embodiments, the eye-tracking device 635 may measure the eye position and/or eye movement up to six degrees of freedom of each eye (i.e., 3D position, roll, pitch, and yaw). In some embodiments, the eye-tracking device 635 may measure pupil size. The eye-tracking device 635 may provide a signal (feedback) to the controller 640 regarding the position and/or movement of the eye pupil 645.

Based on the eye-tracking information provided by the eye-tracking device 635, the controller 640 may be configured to control the tunable optical grating 620 to adjust the steering angle of the light beam, such that the positions of the one or more exit pupils available at the eye-box 630 may be changed, and one of the one or more exit pupils available at the eye-box 630 may substantially coincide with the position of the eye pupil 645 and fall onto the eye pupil 645. This may be done by adjusting the voltage of the power source 280 in FIGS. 2A-2C. Thus, the light beam focused by the second optical lens 625 may be directed into the eye pupil 645. That is, the tunable optical grating 620 and the second optical lens 625 together may continuously shift the exit pupil of the optical assembly 600 to cover an expanded eye-box area based on the eye-tracking information provided by the eye-tracking device 635.

For illustrative purposes, FIG. 6A shows two steering states of the tunable optical grating 620. For example, the eye-tracking device 635 may detect that the eye pupil 645 of the user is located at a position P1 at the eye-box 630 region. Based on the eye-tracking information, the tunable optical grating 620 may be controlled by the controller 640 to switch to a first steering state, such that the scattered light beams 606 that satisfy a diffraction condition (e.g., Bragg condition) may be steered to be light beams 608 by the tunable optical grating 620 via diffraction. The controller 640 may be configured to be coupled with the power source 280 in FIGS. 2A to 2C to adjust the voltage applied to the optical grating 620.

The second optical lens 625 may focus the diffracted light beam 608 at an exit pupil that substantially coincides with the position P1 of the eye pupil 645. After the eye-tracking device 635 detects that the eye pupil 645 of the user is moved to a new position P2 at the eye-box 630 region, based on which the tunable optical grating 620 may be controlled by the controller 640 to switch to a second steering state from the first steering state, such that the scattered light beams 606 that satisfy a diffraction condition (e.g., Bragg condition) may be steered to be light beams 608' by the tunable optical grating 620 via diffraction. The second optical lens 625 may focus the diffracted light beam 608' at an exit pupil that substantially coincides with the new position P2 of the eye pupil 645. That is, the exit pupil of the NED may be shifted from the position P1 to the position P2 in accordance with a movement of the eye pupil 645, through which the eye-box 630 may be expanded. Thus, when the user moves eyes around within the eye-box 630, the optical output (e.g., the displayed virtual image) may not move out of the eye-box 630 to disappear from the user's view.

In the disclosed embodiments, the tunable optical grating 620 may be configured to provide a plurality of steering states to the diffused light beams received from the optical diffuser 615, where the plurality of steering states may correspond to a continuous adjustment range of a steering angle to the diffused light beams received from the optical diffuser 615. Thus, a continuous shift of the exit pupil of the optical assembly 600 may be provided to cover an expanded eye-box area based on the eye-tracking information provided by the eye-tracking device 635. The tunable optical grating 620 may be compact with a thickness of several millimeters to reduce the form factor of the NED. In addition, the tunable optical grating 620 may have a substantially fast switching speed when switching between different steering states, for example, on an order of milliseconds, which may be sufficiently fast to keep pace with the movement of the eye pupil 645. Thus, the real-time eye tracking and real-time shifting of the exit pupil positions may be provided.

Figure 6B:
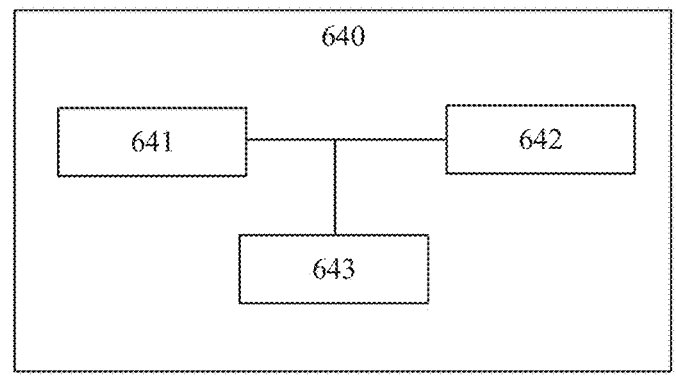
FIG. 6B is a schematic diagram illustrating a schematic diagram of a controller in FIG. 6A, according to an embodiment of the present disclosure.

FIG. 6B illustrates a schematic diagram of the controller 640 in FIG. 6A. As shown in FIG. 6B, the controller 640 may include a processor 641, a storage device 642, and an input/output interface 643. The processor 641 may include any suitable processor, such as a central processing unit, a microprocessor, an application-specific integrated circuit, a programmable logic device, a complex programmable logic device, a field-programmable gate array, etc. The processor 641 may be specially programmed to control the tunable optical grating 620 to adjust a steering angle of the light beam passing through the tunable optical grating 620 based on the feedback (e.g., eye position information) provided by the eye-tracking device 635. In other words, the processor 641 may be configured to change the location of one or more exit pupils available at the eye-box 630 based on the position and/or movement of the eye, as provided by the eye-tracking device 635. The locations of the of one or more exit pupils may be shifted such that at any instance, at least one exit pupil of the one or more exit pupils may fall onto the eye pupil 645.

The storage device 642 may be configured to store data, signal, information, or computer-readable codes or instructions. The storage device 642 may include a non-transitory computer-readable storage medium, such as a magnetic disk, an optical disk, a flash memory, a read-only memory (ROM), or a random-access memory (RAM), etc. The processor 641 may access the storage device 642 and retrieve data or instructions from the storage device 642. In some embodiments, the storage device 642 may store feedback data provided by the eye-tracking device 635. The processor 641 may retrieve the feedback data provided by the eye-tracking device 635 for analysis. In some embodiments, the storage device 642 may store the steering states of the tunable optical grating 620, and the processor 641 may retrieve the current steering states when determining a next steering state for the tunable optical grating 620.

The input/output interface 643 may be any suitable data or signal interface. The input/output interface 643 may be an interface configured for wired or wireless communication. In some embodiments, the input/output interface 643 may include a transceiver configured to receive and transmit signals. In some embodiments, the input/output interface 643 may be configured to communicate with the eye-tracking device 635 and the tunable optical grating 620, and may receive data or signal (or transmit data or signal) from (or to) the eye-tracking device 635 and the tunable optical grating 620.

FIG. 7 illustrates a schematic diagram of an optical assembly 700 including a pitch variable optical element 725, according to another embodiment of the disclosure. The pitch variable optical element may be a tunable optical grating that provides a continuous beam steering, and the optical assembly 700 may be a part of a NED and achieve a pupil steering of the NED for AR, VR or MR applications. As shown in FIG. 7, the optical assembly 700 may include a projector 705 that generates an image light, and an image combiner 720 and a tunable optical grating 725 arranged in optical series to direct the image light towards an eye-box 730 of the optical assembly 700. The optical assembly 700 may further include an eye-tracking device 735 and a controller 740. The controller 740 may be electrically coupled with one or more of the other devices, such as the eye-tracking device 735 and the tunable optical grating 725. The optical assembly 700 may include other elements, which are not limited by the present disclosure. The eye-tracking device 735 may be similar to the eye-tracking device 635 in FIG. 6A, and the controller 740 may be similar to the controller 640 in FIG. 6A and FIG. 6B, and the details are not repeated here.

The projector 705 may include a source 710 and an optics system 715. The source 710 may be a light source that generates coherent or partially coherent light. The source 710 may include, e.g., a laser diode, a vertical cavity surface emitting laser, and/or a light emitting diode. In some embodiments, the source 710 may be a display panel, such as a liquid crystal display (LCD) panel, an liquid-crystal-on-silicon (LCoS) display panel, an organic light-emitting diode (OLED) display panel, a micro-LED (micro light-emitting diode) display panel, a digital light processing (DLP) display panel, or some combination thereof. In some embodiments, the source 710 may be a self-emissive panel, such as an OLED display panel or a micro-LED display panel. In some embodiments, the source 710 may be a display panel that is illuminated by an external source, such as an LCD panel, an LCoS display panel, or a DLP display panel. Examples of an external sources may include a laser, an LED, an OLED, or some combination thereof. The optics system 715 may include one or more optical components that condition the light from the source 710. Conditioning light from the source 710 may include, e.g., polarizing, attenuating, expanding, collimating, and/or adjusting orientation. In some embodiments, the image light output from the projector 705 may be linearly polarized to match the requirement of the tunable optical grating 725.

The image combiner 720 may focuses the image light received from the projector 705 to one or more light spots at a surface where an exit pupil of the NED is located. An exit pupil may be a location where an eye pupil 745 of a user is positioned at the eye-box 730 region when the user wears the NED. In other words, the image combiner 720 may focuses the image light received from the projector 705 to one or more exit pupils of the NED at the eye-box 730 region. When used for AR applications, the image combiner 720 may combine an image light beam received from the projector 705 and a light beam from a real-world environment (not shown in FIG. 7), and direct both light beams towards the eye-box 730 of the NED. In some embodiments, the image combiner 720 may include a holographic optical element (HOE) that has a wide FOV, and the image combiner 720 is also referred to as a HOE image combiner. The HOE may include a fixed hologram that focuses light from a highly off-axis light beam into an on-axis light beam in front of the eye pupil 745. In some embodiments, the HOE may include a volume (or Bragg) hologram, and may function only over a narrow set of angles and wavelengths, thereby redirecting and focusing the light beam received from the projector 705 and, meanwhile, providing a clear, highly transparent see-through view to the user. The HOE may be multiplexed to have high diffraction efficiency at a plurality of wavelengths, (e.g., red, green and blue wavelengths), thereby enabling a full color display.

The tunable optical grating 725 may be similar to the tunable optical grating 620 in FIG. 6A, and the details are not repeated here. In an operation, based on the eye-tracking information provided by the eye-tracking device 735, the controller 740 may control the tunable optical grating 725 to change the positions of the one or more exit pupils via beam steering, such that at least of the one or more exit pupils may substantially coincide with the position of the eye pupil 745 and fall onto the eye pupil 745. That is, the image light emitted from the projector 705 may be finally directed into the eye pupil 745. Because the tunable optical grating provides a continuous adjustment range of a steering angle of an incident light beam, the exit pupil of the optical assembly 700 may be continuously shifted to cover an expanded eye-box area based on the eye-tracking information provided by the eye-tracking device 735.

For illustrative purposes, FIG. 7 shows two steering states of the tunable optical grating 725. For example, the eye-tracking device 735 may detect that the eye pupil 745 of the user is located at a position P1 at the eye-box 730 region. Based on the eye-tracking information, the tunable optical grating 725 may be controlled by the controller 740 to switch to a first steering state, such that at least one of the one or more exit pupils may be steered by the tunable optical grating 725 via diffraction to substantially coincide with the position P1 of the eye pupil 745 and fall onto the eye pupil 745. After the eye-tracking device 735 detects that the eye pupil 745 of the user is moved to a new position P2 at the eye-box 730 region, based on which the tunable optical grating 725 may be controlled by the controller 740 to switch to a second steering state from the first steering state, such that at least one of the one or more exit pupils may be steered by the tunable optical grating 725 via diffraction to substantially coincide with the new position P2 of the eye pupil 745 and fall onto the eye pupil 745. It is to be noted that the controller 740 may be configured to be coupled with the power source 280 in FIGS. 2A to 2C to adjust the voltage applied to the optical grating 725.

It is to be noted that, FIG. 6A and FIG. 7 illustrate two optical assemblies that could achieve the pupil steering of NEDs by using a disclosed tunable optical grating, which are for illustrative purposes and are not intended to limit the scope of the present disclosure. Optical assemblies with different optical configurations may also achieve the pupil steering of NEDs by using a disclosed tunable optical grating.

Figure 8:
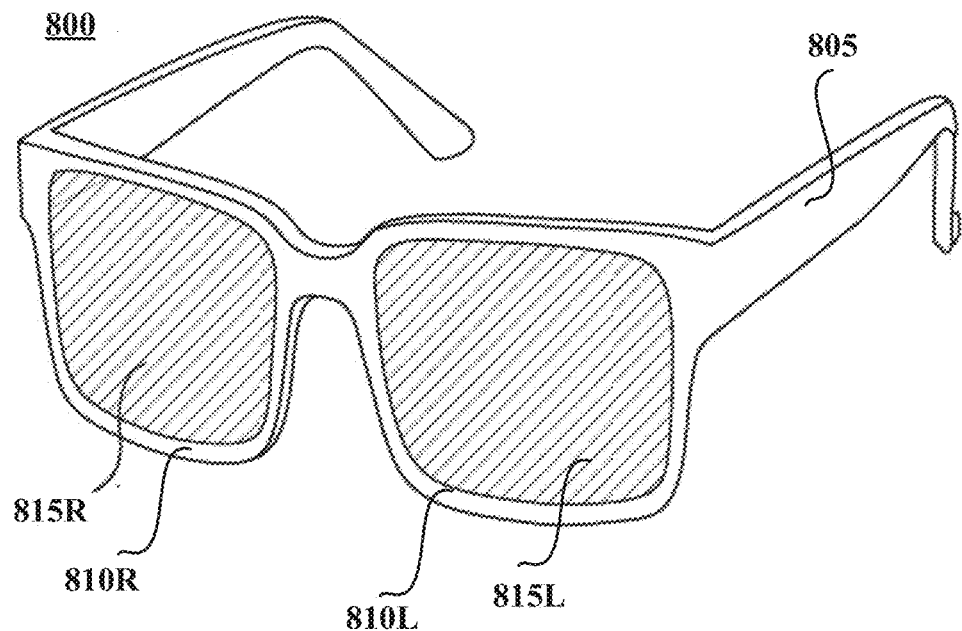
FIG. 8 is a schematic diagram illustrating a schematic diagram of a near-eye display (NED), according to an embodiment of the present disclosure.

FIG. 8 illustrates a schematic diagram of a NED 800 according to an embodiment of the present disclosure. As shown in FIG. 8, the NED 800 may include a frame 805 configured to rest on a user's head, a right-eye and left-eye display systems 810L and 810R mounted to the frame 805. Each of the right-eye and left-eye display systems 810 and 815 may include image display componentry configured to project computer-generated virtual images into left and right display windows 815R and 815L in the user's FOV. An exemplary display system representative of the right-eye and left-eye display systems 810L and 810R may include the optical assembly 600 shown in FIG. 6A or the optical assembly 700 shown in FIG. 7. The NED 800 may function as a VR device, an AR device, a mixed reality MR device, or any combination thereof. In some embodiments, when the NED 800 functions as an AR or a MR device, the right and left display windows 815R and 815L may be entirely or partially transparent from the perspective of the user, to give the user a view of a surrounding real-world environment. In some embodiments, when the NED 800 functions as a VR device, the right and left display windows 815R and 815L may be opaque, such that the user may be completely absorbed in the VR imagery provided via the NED. In some embodiments, the NED 800 may further include a dimming element, which may dynamically adjust the transmittance of real-world objects viewed through the right and left display windows 815R and 815L, thereby switching the NED 800 between a VR device and an AR device or between a VR device and a MR device. In some embodiments, along with switching between the AR/MR device and the VR device, the dimming element may be used in the AR device to mitigate difference in brightness of real and virtual objects.

Figure 9A:
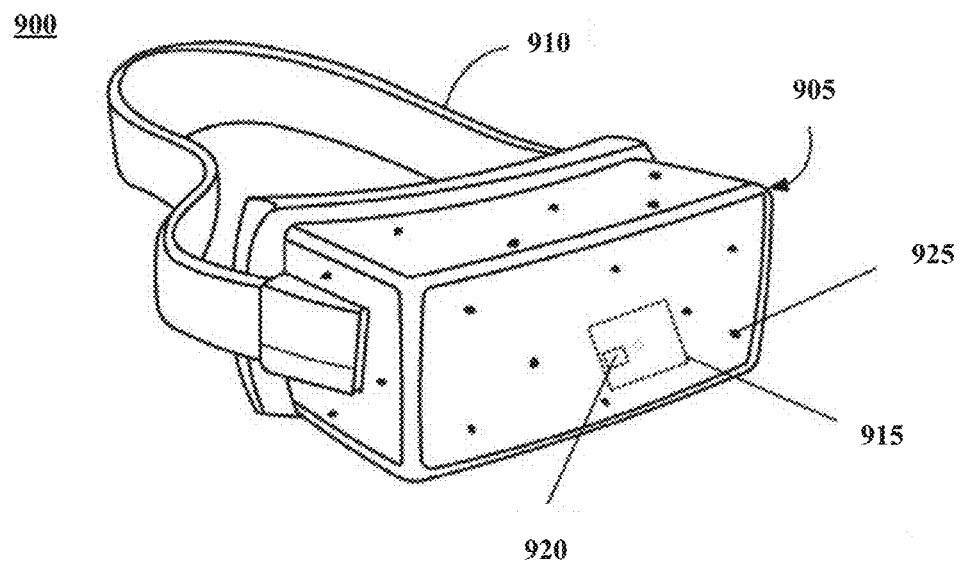
FIG. 9A is an isometric diagram illustrating a wire diagram of a NED, according to another embodiment of the disclosure.
Figure 9B:
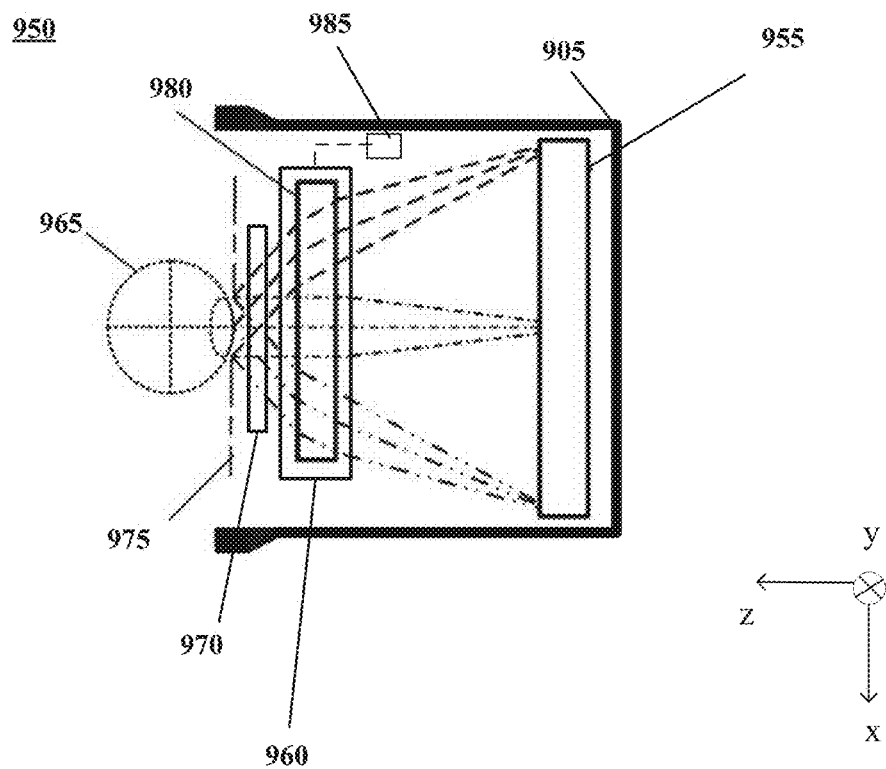
FIG. 9B is a cross-sectional view of the NED in FIG. 9A, according to an embodiment of the present disclosure.

FIG. 9A illustrates a wire diagram of a NED 900 according to another embodiment of the disclosure, and FIG. 9B illustrates a cross section 950 of the front rigid body 905 of the NED 900 shown in FIG. 9A. The NED 900 may include a disclosed pitch variable optical element, which is a diffractive lens that provides a continuous adjustment range of optical power to mitigate the vergence-accommodation conflict in the NED. The NED 900 may be part of an artificial reality system. The NED 900 may display content to a user. As shown in FIG. 9A, the NED 900 may include a front rigid body 905 and a band 910. The front rigid body 905 may include one or more electronic display elements of an electronic display (not drawn in FIG. 9A), an inertial measurement unit (IMU) 915, one or more position sensors 920, and locators 925. In the embodiment shown by FIG. 9A, the position sensors 920 may be located within the IMU 915, and neither the IMU 915 nor the position sensors 920 may be visible to the user. The NED 900 may function as a VR device, an AR device or a MR device, or some combination thereof. In some embodiments, when the NED 900 functions as an AR or a MR device, portions of the NED 900 and its internal components may be at least partially transparent.

FIG. 9B is a cross section 950 of the front rigid body 905 of the embodiment of the NED 900 shown in FIG. 9A. As shown in FIG. 9B, the front rigid body 905 may include an electronic display 955 and a varifocal block 960 that together provide an image light to an exit pupil 975. The exit pupil 975 may be the location of the front rigid body 905 where a user's eye 965 is positioned. For illustrative purposes, FIG. 9B shows a cross section 950 associated with a single eye 965, but another varifocal block 960, separate from the varifocal block 960, may provide altered image light to another eye of the user. In some embodiments, the front rigid body 905 may further include an eye-tracking device 970 that determines eye-tracking information for the user's eye 965. The eye-tracking device 970 may include, e.g., one or more sources that illuminate one or both eyes of the user, and one or more cameras that captures images of one or both eyes of the user. The determined eye-tracking information may include information of an orientation of the user's eye 965 at the eye-box, i.e., information about an angle of an eye-gaze. In some embodiments, the user's eye 965 may be illuminated with structured light, and the eye-tracking device 970 may use locations of the reflected structured light in a captured image to determine eye position and eye-gaze. In some embodiments, the eye-tracking device 970 may determine eye position and eye-gaze based on magnitudes of image light captured over a plurality of time instants.

The electronic display 955 may display images to the user. In some embodiments, the electronic display 955 may comprise a single electronic display or multiple electronic displays (e.g., a display for each eye of a user). Examples of the electronic display 955 include: a liquid crystal display (LCD), an organic light-emitting diode (OLED) display, an active-matrix organic light-emitting diode display (AMOLED), a quantum dot organic light-emitting diode (QOLED), a quantum dot light-emitting diode (QLED), some other display, or some combination thereof. In some embodiments, the electronic display 955 may include a stack of one or more waveguide displays including, but not limited to, a stacked waveguide display. In some embodiments, the stacked waveguide display may be a polychromatic display (e.g., a red-green-blue (RGB) display) created by stacking waveguide displays whose image light is from respective monochromatic sources of different colors. In some embodiments, the stacked waveguide display may be a monochromatic display.

The varifocal block 960 may adjust an orientation from light emitted from the electronic display 955, such that it appears at particular focal distances from the user. The varifocal block 960 may include a disclosed pitch variable optical element 980, which is a diffractive lens 980 that provides a continuous adjustment range of optical power to varifocal block 960. The diffractive lens 980 may be an embodiment of the LC cell 500 in FIG. 5A, and the details are not repeated here. Additionally, in some embodiments, the varifocal block 960 may magnify received light, corrects optical errors associated with the image light, and presents the corrected image light is presented to a user of the NED 900. The varifocal block 960 may additionally include one or more optical elements in optical series. An optical element may be an aperture, a Fresnel lens, a convex lens, a concave lens, a filter, a linear polarizer or any other suitable optical element that alters the image light. For example, a linear polarizer may be optically coupled to the diffractive lens 980, to ensure the light incident onto the diffractive lens 980 is a linearly polarized light having a desired polarization direction.

In some embodiments, a controller 985 may be coupled to the diffractive lens 980 to determine an optical power of the diffractive lens 980, based on the eye-tracking information obtained from the eye-tracking device 970. The controller 985 may track the position and location of the user's eyes 965 using image information from the eye-tracking device 970, to determine a location or an object within a virtual image where the user is currently looking. In some embodiments, the controller 985 may track at least a subset of a 3D position, roll, pitch, and yaw of the eye, and use these quantities to estimate a 3D gaze point of each eye. In some embodiments, the controller 985 may use information from past eye positions, information describing a position of the user's head, and information describing a scene presented to the user to estimate the 3D gaze point of the eye 965.

Based on an estimated intersection of gaze lines, the controller 985 may determine a vergence distance of the location or the object within the virtual image where the eye 965 is currently looking. Based on the determined vergence distance and other information, the controller 985 may determine a desired optical power of the diffractive lens 980. Based on the determined optical power of the diffractive lens 980 and the eye tracking information, the controller 985 may determine configuration parameters for the diffractive lens 980. For example, based on the eye tracking information, the controller 985 may determine desired driving voltages provided by the power source 280 (in FIGS. 2A to 2C) applied to the respective sub-electrodes of the diffractive lens 980, thereby focusing the location or the object within the virtual image where the eye 965 is currently looking at an image plane with a desired image distance corresponding to the vergence distance.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical element, comprising:
   a liquid crystal (LC) mixture including a plurality of flexoelectric domains; and
   a first electrode and a second electrode configured to provide a driving voltage to the flexoelectric domains in the LC mixture,
   wherein a pitch of a flexoelectric domain is variable as an amplitude of the driving voltage varies, and
   wherein the LC mixture includes:
   a host LC; and
   one or more LC dimers dissolved as a guest in the host LC, the host LC and the one or more LC dimers having respective dielectric anisotropies of opposite signs in a nematic phase, and a net dielectric anisotropy of the LC mixture being neutral.

2. The optical element of claim 1, wherein the driving voltage is a direct current (DC) voltage or an ultra-low frequency alternating current (AC) voltage.

3. The optical element of claim 1, wherein the first electrode and the second electrode are planar electrodes arranged opposite to each other.

4. The optical element of claim 1, further comprising a first alignment layer and a second alignment layer disposed at the first electrode and the second electrode, respectively, the first alignment layer and the second alignment layer configured to provide anti-parallel alignment directions to LCs in the LC mixture.

5. The optical element of claim 1, wherein the first electrode and the second electrode are arranged opposite to each other, and at least one of the first electrode and the second electrode includes a plurality of sub-electrodes.

6. The optical element of claim 5, wherein the driving voltage varies spatially across the sub-electrodes of the at least one of the first electrode and the second electrode.

7. The optical element of claim 5, wherein the driving voltage is spatially uniform across the remaining one of the first electrode and the second electrode.

8. The optical element of claim 1, wherein the plurality of flexoelectric domains have a uniform pitch.

9. The optical element of claim 1, wherein the plurality of flexoelectric domains have different pitches.

10. The optical element of claim 1, wherein the pitch of the flexoelectric domain decreases as the amplitude of the driving voltage increases.

11. The optical element of claim 1, wherein the flexoelectric domains are configured to diffract a first light beam with a predetermined polarization as a second light beam, and a diffraction angle of the second light beam is variable as the pitch of the flexoelectric domain varies.

12. The optical element of claim 4, wherein the pitch of the flexoelectric domain is in a direction perpendicular to an alignment direction provided by the first alignment layer or the second alignment layer.

13. The optical element of claim 5, wherein the sub-electrodes include a circular center electrode and a plurality of concentric ring electrodes surrounding the circular center electrode.

14. The optical element of claim 1, wherein at least one of the host LC or the one or more LC dimers has the nematic phase in a temperature range that includes a room temperature.

15. The optical element of claim 1, wherein the host LC has negative dielectric anisotropy in the nematic phase, and the one or more LC dimers have positive dielectric anisotropy in the nematic phase.

16. The optical element of claim 1, wherein at least one of the one or more LC dimers has a bent-shaped molecular structure, or a pear-shaped molecular structure.

17. The optical element of claim 1, wherein a weight percentage of the host LC in the LC mixture is larger than 50%.

* * * * *